(12) United States Patent
Tucker et al.

(10) Patent No.: US 12,301,066 B2
(45) Date of Patent: May 13, 2025

(54) MOTOR ENCODER ASSEMBLY PROVIDING OPTIMIZED SENSOR ALIGNMENT

(71) Applicant: Nidec Motor Corporation, St. Louis, MO (US)

(72) Inventors: John M. Tucker, St. Louis, MO (US); Jeffrey M. Hutsler, Troy, MO (US)

(73) Assignee: Nidec Motor Corporation, St. Louis, MO (US)

( * ) Notice: Subject to any disclaimer, the term of this patent is extended or adjusted under 35 U.S.C. 154(b) by 289 days.

(21) Appl. No.: 17/863,682

(22) Filed: Jul. 13, 2022

(65) Prior Publication Data

US 2023/0020223 A1 Jan. 19, 2023

Related U.S. Application Data

(60) Provisional application No. 63/221,882, filed on Jul. 14, 2021.

(51) Int. Cl.
| | | |
|---|---|---|
| *H02K 11/215* | (2016.01) | |
| *G01D 18/00* | (2006.01) | |
| *H02K 11/01* | (2016.01) | |
| *H02K 15/14* | (2025.01) | |
| *H02K 29/08* | (2006.01) | |

(52) U.S. Cl.
CPC ......... *H02K 11/215* (2016.01); *G01D 18/001* (2021.05); *H02K 11/01* (2016.01); *H02K 15/14* (2013.01); *H02K 29/08* (2013.01); *H02K 11/0141* (2020.08); *H02K 2213/09* (2013.01)

(58) Field of Classification Search
CPC ..... H02K 11/215; H02K 29/08; G01D 18/001

USPC ........................................................ 310/68 B
See application file for complete search history.

(56) References Cited

U.S. PATENT DOCUMENTS

| | | | |
|---|---|---|---|
| 2004/0183386 A1* | 9/2004 | Kuwert | H02K 5/225 |
| | | | 310/71 |
| 2005/0181649 A1* | 8/2005 | Meyer | G01D 5/3473 |
| | | | 439/144 |
| 2009/0230824 A1 | 9/2009 | Hornberger et al. | |
| 2013/0300262 A1 | 11/2013 | Smith | |

(Continued)

FOREIGN PATENT DOCUMENTS

| | | | |
|---|---|---|---|
| JP | 2008145153 A | * | 6/2008 |
| JP | 201726383 | | 2/2017 |

(Continued)

OTHER PUBLICATIONS

Translation of WO 2017207926 A1 (Year: 2017).*

(Continued)

*Primary Examiner* — Michael Andrews
*Assistant Examiner* — Daniel K Schlak
(74) *Attorney, Agent, or Firm* — Hovey Williams LLP

(57) ABSTRACT

An electric motor includes a stator, a rotor rotatable relative to the stator, a housing, and an encoder assembly. The housing defines a motor chamber in which the stator and rotor are at least partly housed. The housing includes an endshield that defines in part the motor chamber. The encoder assembly is configured to sense an operational parameter of the motor and includes an encoder and an encoder cover. The encoder is adjustably positioned within an axially recessed channel of the endshield. The encoder cover is secured relative to the endshield to at least partially overlie the encoder.

8 Claims, 12 Drawing Sheets

(56) References Cited

U.S. PATENT DOCUMENTS

2015/0122983 A1\* 5/2015 Martin ............... G01D 5/34707
250/231.13
2019/0326799 A1\* 10/2019 Kaneko ................. H02K 11/02

FOREIGN PATENT DOCUMENTS

| JP | 2019517764 | 6/2019 | | |
|---|---|---|---|---|
| KR | 1020190038822 | 4/2019 | | |
| WO | WO-2017207926 A1 \* | 12/2017 | ............ | G01D 18/00 |
| WO | WO-2019169842 A1 \* | 9/2019 | | |

OTHER PUBLICATIONS

Translation of WO 2019169842 A1 (Year: 2019).\*
Translation of JP 2008145153 A (Year: 2008).\*
International Search Report and Written Opinion for PCT Application No. PCT/US2022/036961 (Dated Nov. 8, 2022).

\* cited by examiner

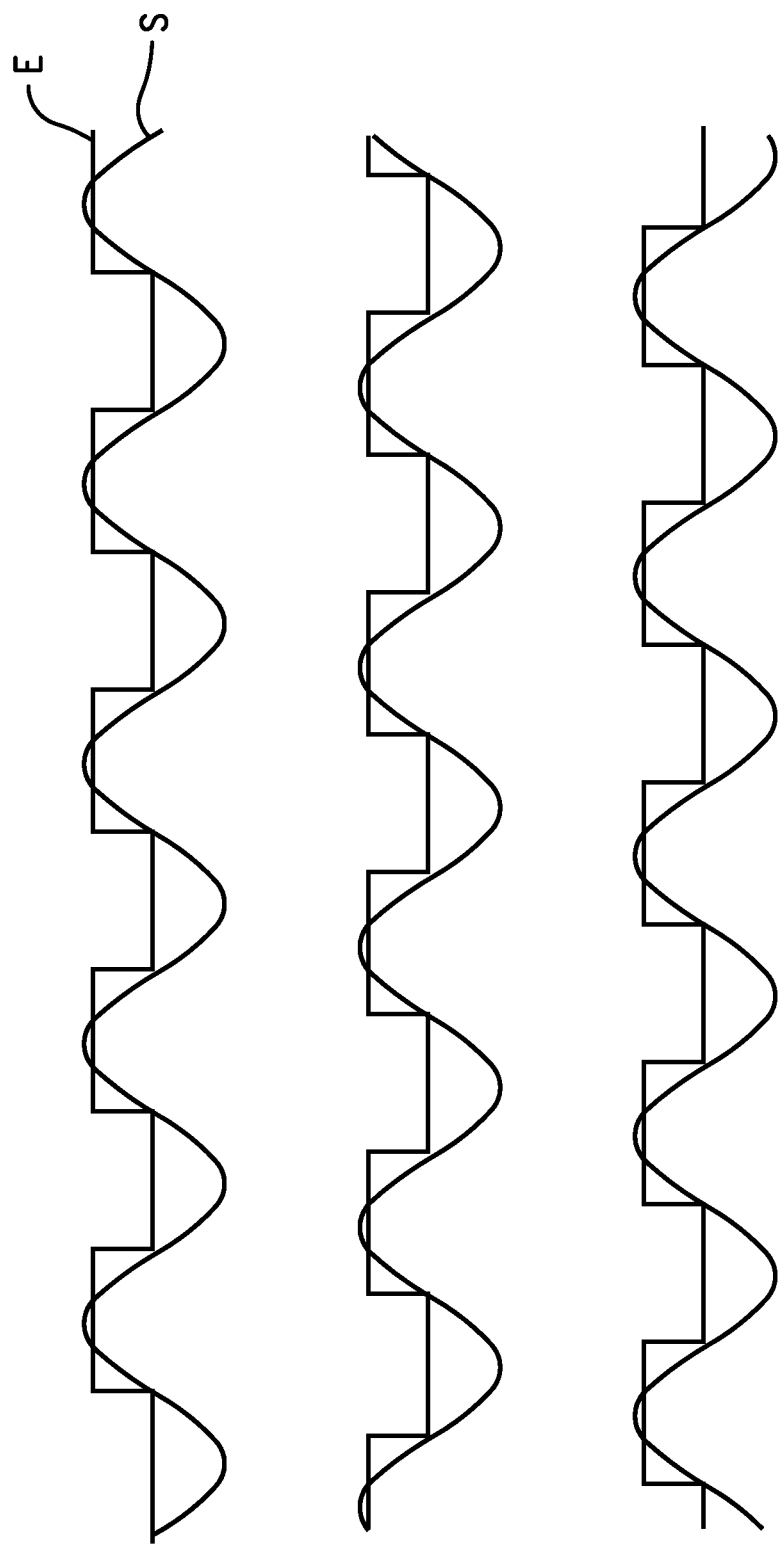

MOTOR ENCODER ASSEMBLY PROVIDING OPTIMIZED SENSOR ALIGNMENT

CROSS-REFERENCE TO RELATED APPLICATIONS

This patent application claims priority to identically-titled U.S. Patent Application No. 63/221,882, filed Jul. 14, 2021, the entire contents of which are hereby incorporated herein by reference.

BACKGROUND

1. Field

The present invention relates generally to an electric motor with an encoder. More specifically, embodiments of the present invention concern an electric motor with an adjustable encoder positioned generally outside the motor case.

2. Discussion of Prior Art

It is well known for an electric motor to include an encoder for sensing an operational parameter (such as rotation) of the rotor. At least some prior art electric motors have an encoder rigidly positioned relative to the stator, such as an encoder fixedly supported on the endshield. However, prior art motors with encoders rigidly mounted to an endshield may have certain deficiencies. For instance, the tolerances associated with features of the motor, the endshield, and the encoders may create an excessive tolerance stack-up, such that the encoder is imprecisely located relative to the stator.

For certain conventional motors, the position of the encoder may be manually adjusted to align the encoder relative to the stator. However, such prior art motors have an encoder alignment process that is known to be labor intensive and is prone to introduce alignment error.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide an electric motor assembly that does not suffer from the problems and limitations of prior art motors, including those set forth above.

A first aspect of the present invention concerns an electric motor that broadly includes a stator, a rotor, a housing, and an encoder assembly. The rotor is rotatable relative to the stator. The housing defines a motor chamber in which the stator and rotor are at least partly housed. The housing includes an endshield that defines in part the motor chamber. The encoder assembly is configured to sense an operational parameter of the motor. The encoder assembly includes an encoder and an encoder cover. The endshield includes an axially recessed encoder channel and an aligned encoder opening extending between the recessed encoder channel and the motor chamber. The encoder is adjustably positioned within the recessed encoder channel. The encoder cover is secured relative to the endshield to at least partially overlie the encoder.

A second aspect of the present invention concerns an encoder assembly kit facilitating encoder alignment and installation as part of an electric motor. The electric motor includes a stator, a relatively rotatable rotor, and a housing in which the stator and rotor are at least partly housed. The encoder assembly kit broadly includes an adjustably positionable encoder, an encoder cover, and an alignment tool operable to position the encoder. The encoder and the alignment tool cooperatively present a complemental pin and hole arrangement, with the pin being removably receivable within the hole to operably couple the encoder and alignment tool. The encoder cover includes a pin-receiving slot through which the pin extends when received in the hole, such that the pin is shiftable through the slot as the tool and encoder are moved together.

A third aspect of the present invention concerns a method of aligning and installing an encoder assembly as part of an electric motor. The encoder assembly alignment and installation method broadly includes the steps of locating an encoder relative to the housing of the electric motor; removably coupling an alignment tool with the encoder; shifting the encoder relative the housing using the alignment tool until the encoder is aligned; and securing the encoder board relative to the housing.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 11:
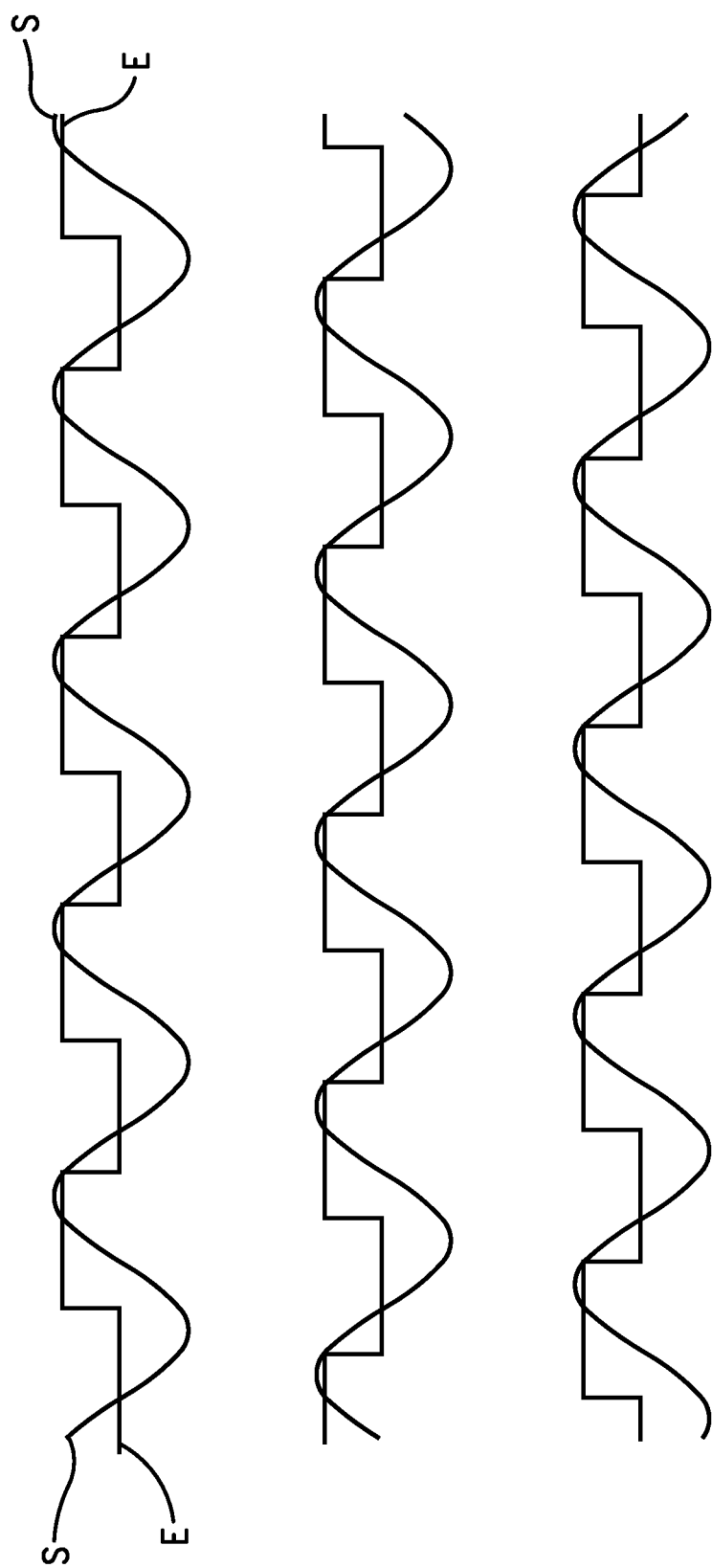

FIG. 11 is a schematic illustration of a testing device display, showing a stator output waveform and an encoder output waveform when back-driving the motor, with the waveforms being offset from each other to indicate a misaligned condition, which is associated with the encoder being misaligned relative to the stator; and FIG. 12 is a schematic illustration of a testing device display similar to FIG. 11, but showing the waveforms shifted relative to each other to indicate an aligned condition, which is associated with the encoder being aligned relative to the stator.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Turning to FIGS. 1-6, an electric motor assembly 20 is constructed in accordance with a preferred embodiment of the present invention. The motor assembly 20 broadly includes a motor housing 22, a motor 24, a code wheel 26, an encoder assembly 28, and an encoder alignment tool 30 (shown in FIG. 9).

Figure 1:
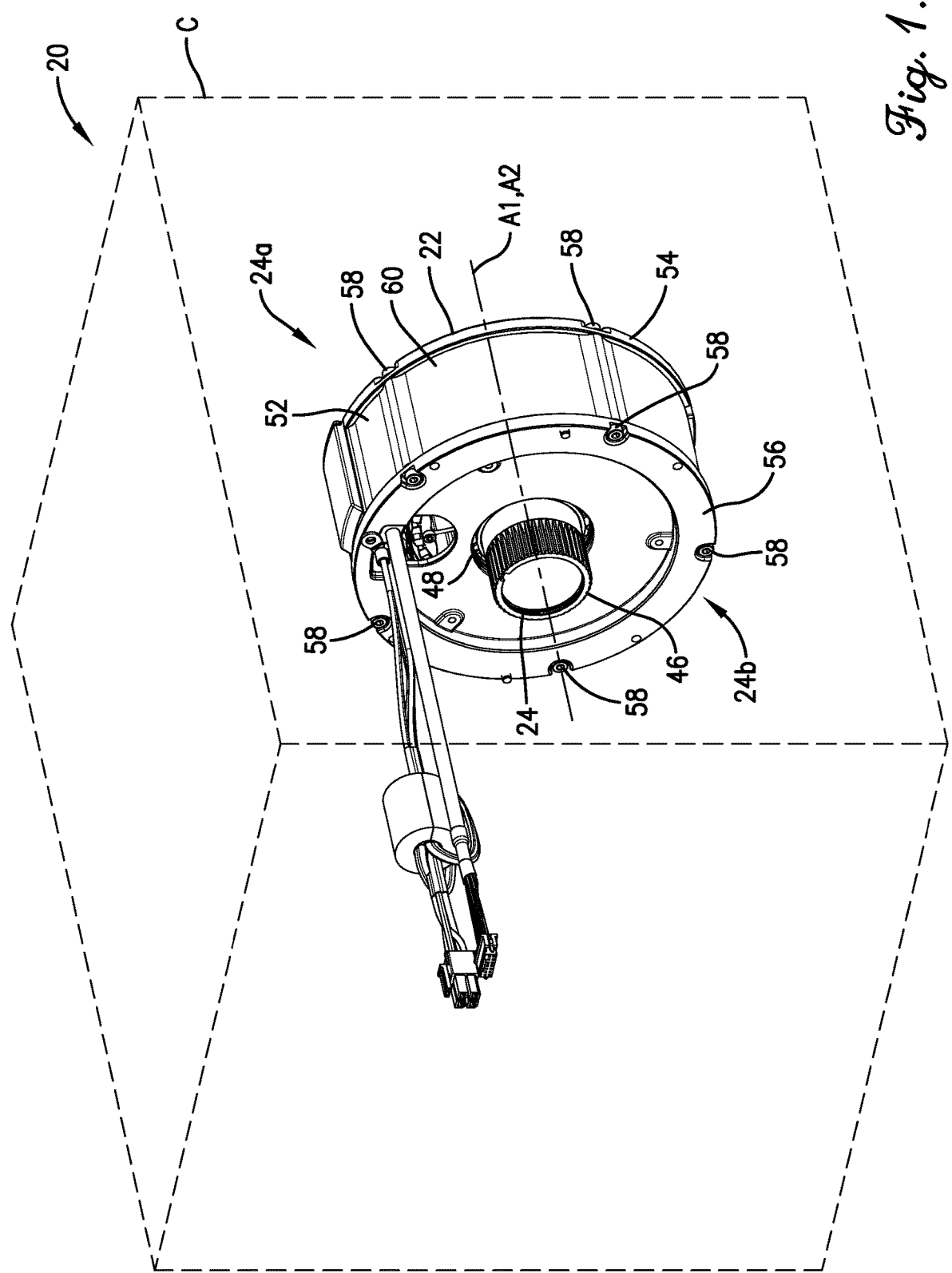
FIG. 1 is a perspective of an autonomous guided vehicle with an electric motor assembly constructed in accordance with a preferred embodiment of the present invention.

The motor assembly 20 is illustrated as part of an autonomous guided vehicle C (see FIG. 1). However, the motor assembly 20 may be incorporated into a variety of alternative applications and may be alternatively configured for use in such applications. In alternative embodiments, the motor assembly may be configured to supply rotational power to any of various alternative devices, and such alternative devices may include a variety of power transmission elements (for example, shafts, gears, sprockets, chains, belts, pulleys, wheels, and/or other elements).

Figure 10:
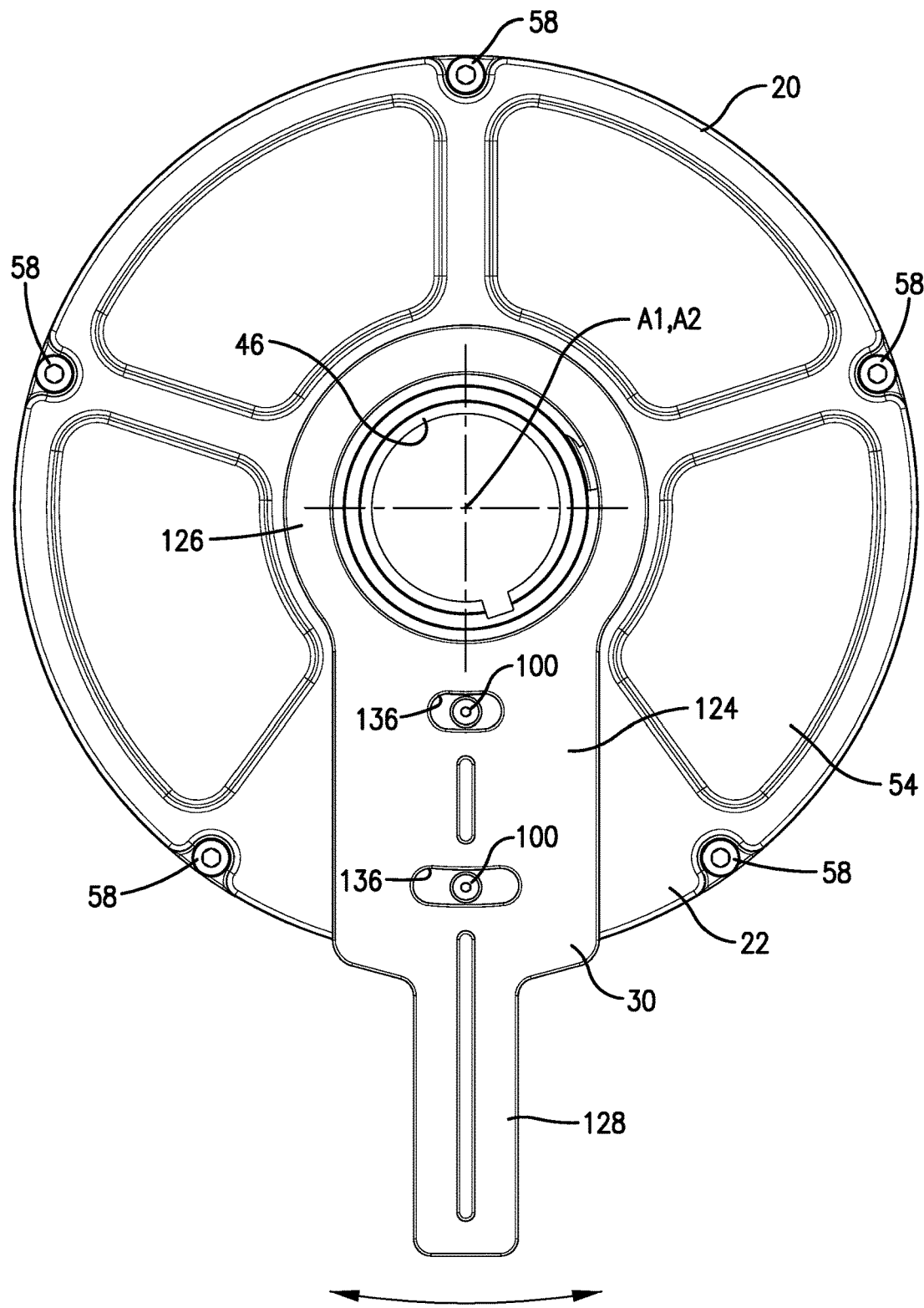
FIG. 10 is a front elevation of the electric motor assembly shown in FIG. 9, showing the alignment tool engaged with the encoder for angular adjustment of the encoder.

The motor 24 is preferably in the form of a brushless, permanent magnet motor and is configured to operate as a servo motor. The motor 24 broadly includes a rotor 32 and a stator 34 (see FIGS. 2-4). The rotor 32 is preferably rotatable relative to the stator 34 about a rotor axis A1 that extends between opposite motor ends 24a,b (see FIGS. 1 and 10). In a preferred embodiment, the stator 34 at least substantially circumscribes the rotor 32. The motor 24 is supported within the motor housing 22. Motor 24 preferably comprises an inner rotor design, but it is also within the ambit of the present invention for the motor to have an outer rotor or dual rotor configuration. As will be described in greater detail, the motor assembly 20 is preferably configured so that at least a portion (such as a printed circuit board, a sensor, and/or another encoder element) of the encoder assembly 28 can be adjustably positioned after a majority of the motor assembly 20 (such as the motor housing 22 and the motor 24) is fully assembled.

Still referring to FIGS. 1-6, the stator 34 preferably includes a generally toroidal stator core 38 and wiring 40 wound about the stator core 38 to form a plurality of coils. The stator core 38 preferably comprises a ferromagnetic material such as steel, although use of any one or more electrically conductive materials is permissible without departing from the scope of the present invention. The stator core 38 preferably defines a stator axis A2 (see FIGS. 1 and 10). Most preferably, the axis A2 is co-axial with the axis A1 of the rotor 32, although offset or skewed axes are permissible according to some aspects of the present invention.

The wiring 40 forming the coils is preferably electrically conductive wiring wound multiple times about a respective tooth to form a plurality of turns or loops. The wiring 40 is preferably formed of copper or aluminum, although any one or more of a variety of electrical conductive materials or a combination thereof may be used within the ambit of the present invention. Furthermore, the wiring 40 may be coated or uncoated.

Figure 3:
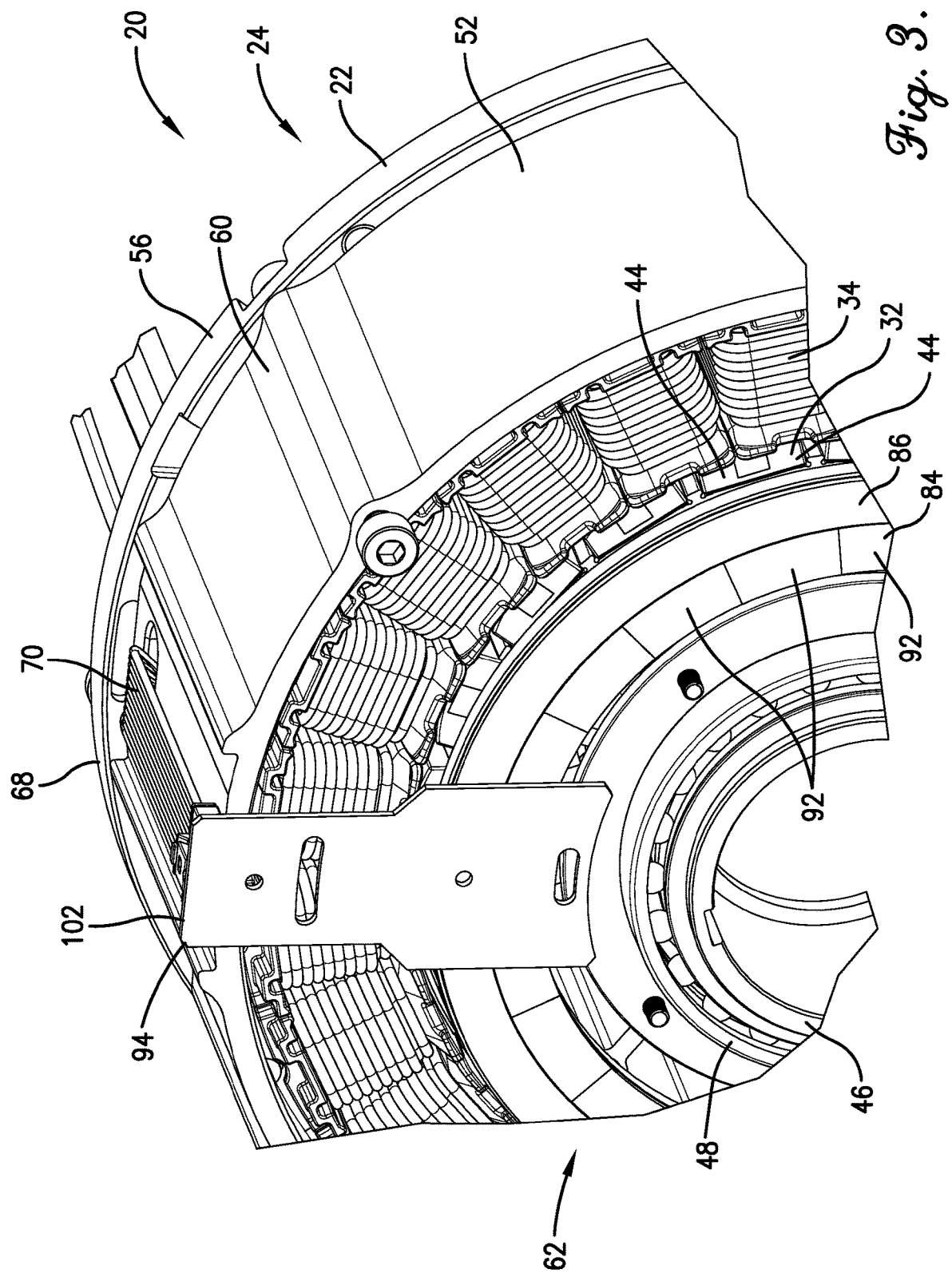
FIG. 3 is a fragmentary perspective of the electric motor assembly similar to FIG. 2, but showing the one endshield removed to depict a rotor and stator of the inner rotor motor, with a code wheel attached to the rotor, and further showing an encoder attached to the encoder cable and operably positioned adjacent the code wheel.
Figure 4:
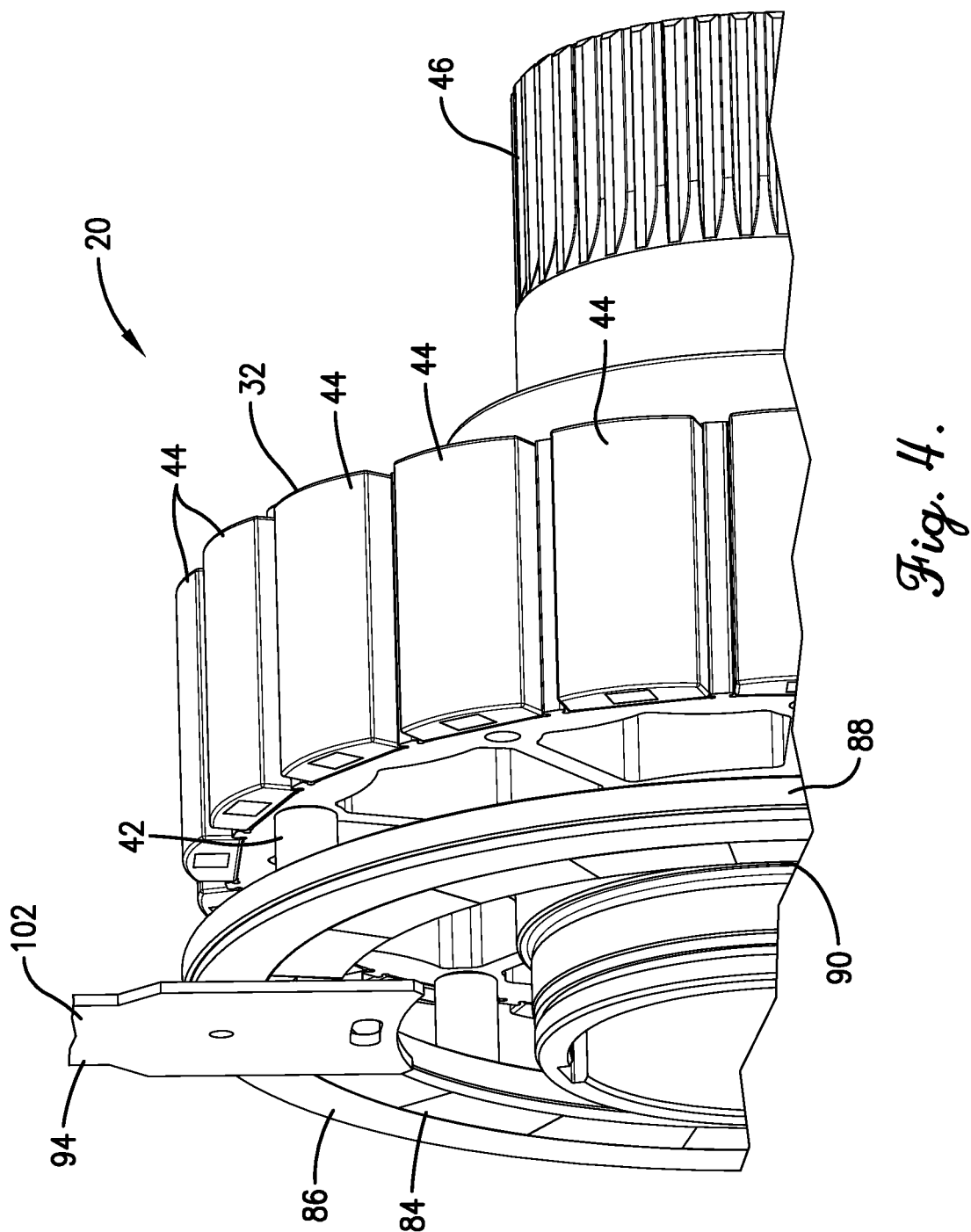
FIG. 4 is a fragmentary perspective of the electric motor assembly shown in FIGS. 1-3, showing the code wheel attached to the rotor, with the encoder operably associated with the code wheel.

The illustrated rotor 32 preferably includes a rotor core 42, a plurality of magnets 44, and a rotor shaft 46 defining the rotor axis A1 for the rotor 32 (see FIG. 4). The rotor core 42 and magnets 44 are generally located within the motor housing 22 (see FIG. 3). The rotor shaft 46 is rotatably supported relative to the motor housing 22 to rotate about the rotor axis A1 by a pair of shaft bearings 48 (see FIGS. 1-3).

The motor housing 22 preferably includes a shell 52, opposite endshields 54,56, and fasteners 58 (see FIG. 1). The housing 22 also presents an exterior motor surface 60 and an internal motor chamber 62 (see FIG. 3). The motor chamber 62 at least substantially receives the rotor 32 and the stator 34 (see FIGS. 1 and 3).

In a preferred embodiment, the shell 52 extends generally circumferentially about the stator 34. It is permissible according to some aspects of the present invention, however, for the shell to extend in such a manner as to have an alternative cross-sectional shape, in contrast to the preferred generally cylindrical form, or to otherwise have alternative side surfaces. Further, although the depicted shell has a generally solid configuration, alternative shell embodiments may be vented.

The endshields 54 and 56 preferably support respective shaft bearings 48 and thereby rotatably support the rotor shaft 46. The depicted endshields 54 and 56 are preferably secured to the shell 52 by means of the fasteners 58. However, it is within the ambit of the present invention where the housing has an alternative shell and/or alternative endshields. Furthermore, the shell and endshields could be alternatively secured to one another. For some aspects of the present invention, the motor could also be configured for use without the shell and/or endshields.

Figure 2:
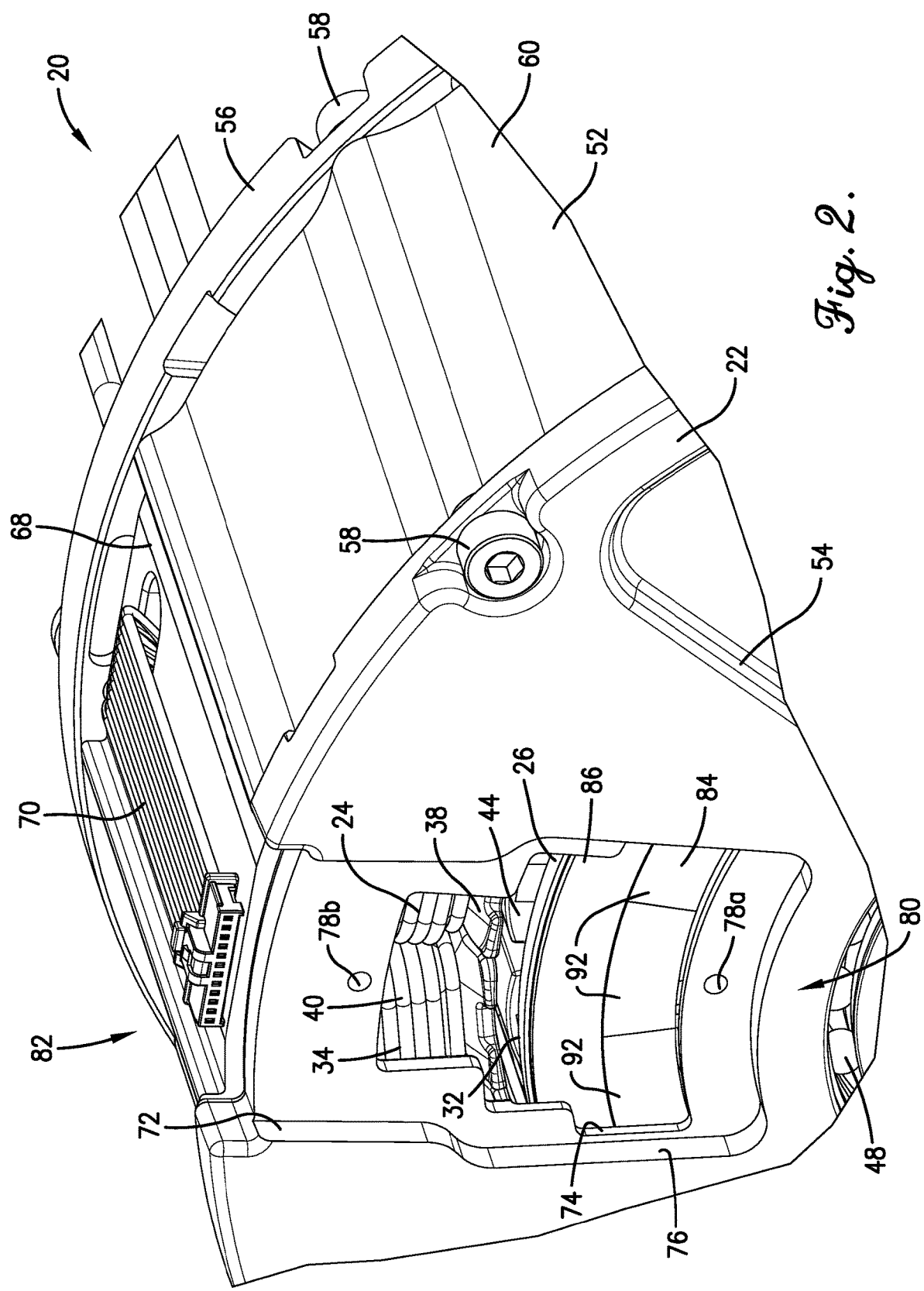
FIG. 2 is an enlarged fragmentary perspective of the electric motor assembly shown in FIG. 1, showing an encoder cable extending axially along a cable channel defined by the shell, with one of the endshields presenting an encoder channel configured to receive an encoder assembly.

Shell 52 preferably presents an axially-extending cable channel 68 configured to receive an encoder cable 70 of the encoder assembly 28 (see FIGS. 2 and 3). The cable channel 68 extends axially between the endshields 54,56 so that the cable 70 may run along the axial length of the motor 24 for attachment to the encoder.

Figure 5:
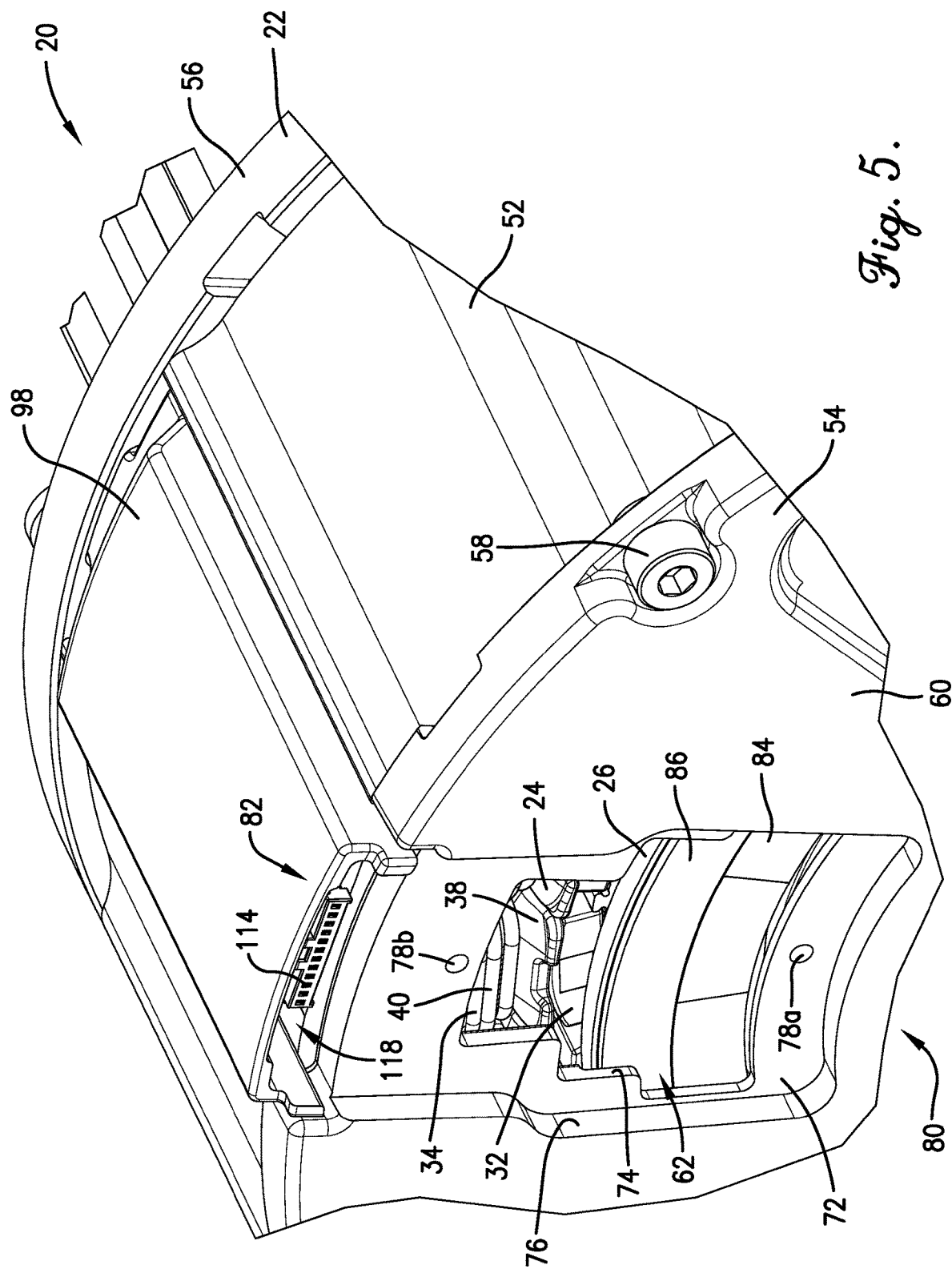
FIG. 5 is a fragmentary perspective of the electric motor assembly similar to FIG. 2, but showing a cable cover engaged with the motor shell in a covering relationship with the cable channel to enclose the encoder cable.
Figure 6:
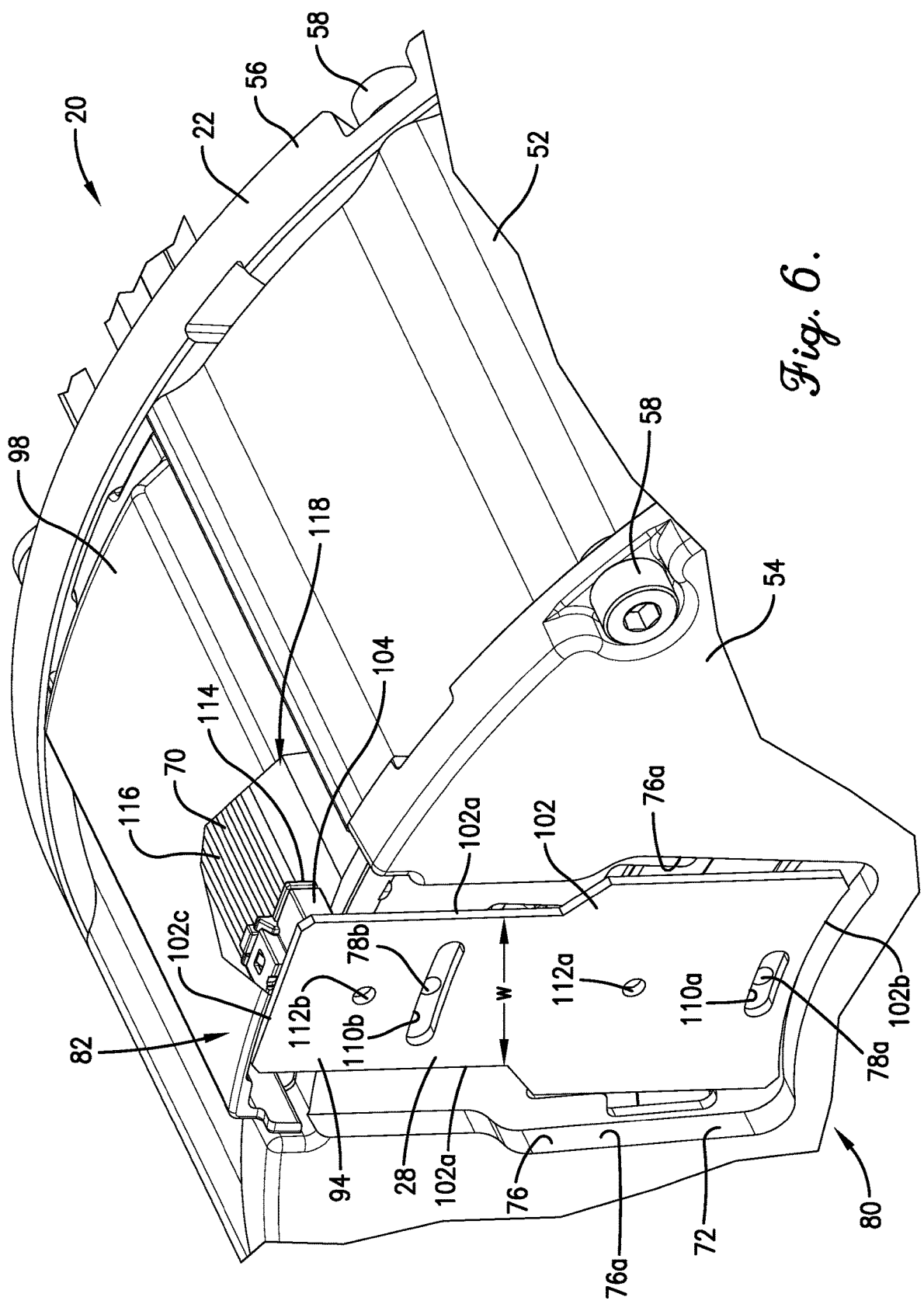
FIG. 6 is a fragmentary perspective of the electric motor assembly similar to FIG. 5, but showing the encoder located within the encoder channel and attached to the encoder cable.

The endshield 54 preferably presents an axially recessed encoder channel 72 to receive corresponding parts of the encoder assembly 28 and an encoder opening 74 aligned with the encoder channel 72 (see FIGS. 2, 5 and 6). (It should be understood that the "aligned" nature of the encoder opening 74 simply refers to the opening 74 functioning to intercommunicate the channel 72 and the motor chamber 62. The term shall not require the channel 72 and opening 74 to be coextensive.) A peripheral shoulder 76 defines an outer margin of the encoder channel 72 and is shaped to receive parts of the cover and board of the encoder assembly 28. Endshield 54 also preferably presents radially inner and radially outer fastener openings 78a,78b located adjacent radially inboard and outboard ends 80,82 of the encoder opening 74 (see FIG. 2).

In the illustrated embodiment, the code wheel 26 cooperates with the encoder assembly 28 to provide a commutating motor that provides efficient and accurate alignment of the encoder once the motor assembly 20 is fully assembled.

As used herein, encoder "alignment" broadly refers to positioning of the encoder board (or, at least the sensor element) so that it properly senses one or more elements that the sensor is configured to sense (such as a magnetic ring, optical disc, and/or other structure with detectable elements). As will be described below, in the preferred embodiment, encoder "alignment" is associated with proper positioning of the sensor so that the stator back EMF waveform is generally aligned with the UVW output of the encoder.

Turning to FIGS. 2-5, code wheel 26 preferably comprises an endless ring-shaped structure that includes an inner commutation track 84 and an outer incremental encoder track 86 that are concentrically arranged with one another. In the illustrated embodiment, the code wheel 26 is cooperatively formed by an endless ring-shaped support structure 88 and an endless die-cut magnet sheet 90 supported by the support structure 88 (see FIG. 4). The magnet sheet 90 comprises a single, continuous disc of die-cut magnet material and is magnetized to provide the commutation track 84 and the encoder track 86 in a concentric arrangement.

The commutation track 84 and encoder track 86 each comprise a multi-pole magnetic disc structure fixed relative to the rotor for rotational movement therewith. Commutation track 84 preferably is magnetic and includes a series of magnet sections 92 (see FIGS. 2 and 3) located circumferentially along the support structure and positioned in an alternating pole arrangement that corresponds to a polarity of the rotor. The poles of the commutation track 84 are presented to the hall switches of the encoder assembly 28 for U/V/W commutation output, as described below.

Preferably, the commutation track 84 has twenty (20) magnet sections 92 that are arranged circumferentially to define twenty (20) poles, although alternative embodiments of the commutation track may include more or fewer magnet sections. As described below, magnet sections 92 correspond, respectively, to magnets 44 of the rotor 32 and are circumferentially aligned with respective rotor magnets 44.

Similarly, encoder track 86 has a series of magnet sections (not shown) located circumferentially along the support structure and positioned in an alternating pole arrangement. As discussed below, the poles of the encoder track 86 are presented to the encoder chip of the encoder assembly 28 for A/B incremental encoder output.

Support structure 88 preferably comprises a steel material, although an alternative support structure may include other materials, such as an alternative metallic material (for example, aluminum) and/or a synthetic resin material. The magnet sheet 90 is preferably fixed to the support structure 88 and, more preferably, is adhered to the support structure 88 by an adhesive layer (not shown). In alternative embodiments, the support structure and magnet sheet may be alternatively fixed to one another (for instance, the support structure and magnet sheet may be attached to one another with pins, rivets, threaded fasteners, clamps, and/or other fastening elements).

For at least certain aspects of the present invention, alternative embodiments of the code wheel may be configured for use with an alternative encoder. For instance, the code wheel may be configured for use with an optical encoder, and the outer encoder track may include a series of optical targets located circumferentially along the code wheel. An alternative magnetic code wheel construction is also within the ambit of the present invention. In fact, according to some aspects of the present invention, the encoder need not be used in connection with motor commutation. For example, the encoder may alternatively be another sensor operable to sense rotor position, direction, movement, speed, acceleration, and/or other parameters for other operational purposes. Yet further, according to some aspects of the present invention, the code wheel could be eliminated altogether, such that the encoder sensor is configured to directly sense the magnetic polarity of the rotor itself.

Code wheel 26 is preferably attached to the rotor 32 and spins with the rotor 32. The code wheel 26 is also attached to the rotor 32 so that magnet sections 92 of the commutation track 84 are positioned in circumferential alignment with respective rotor magnets 44. As a result, the magnetic poles of magnet sections 92 are circumferentially aligned with the magnetic poles of rotor magnets 44. Offset commutation track magnets that are positioned arcuately offset relative to the rotor magnets are within the ambit of certain aspects of the present invention, as long as such offset is well-defined and properly accommodated for in the motor design (particularly with respect to encoder alignment).

Figure 7:
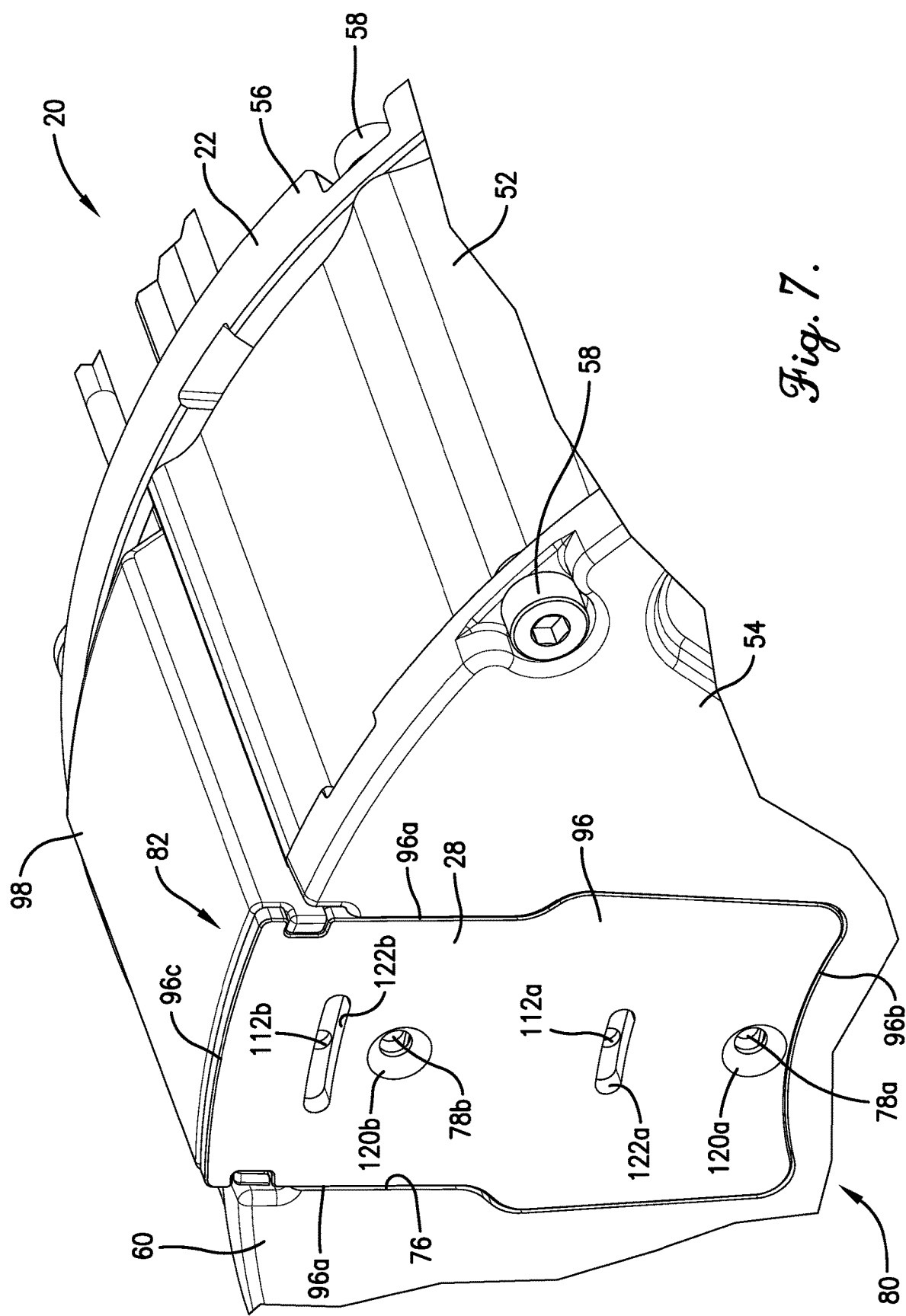
FIG. 7 is a fragmentary perspective of the electric motor assembly similar to FIG. 6, but showing an encoder cover mounted onto the endshield to enclose the encoder within the encoder channel.
Figure 8:
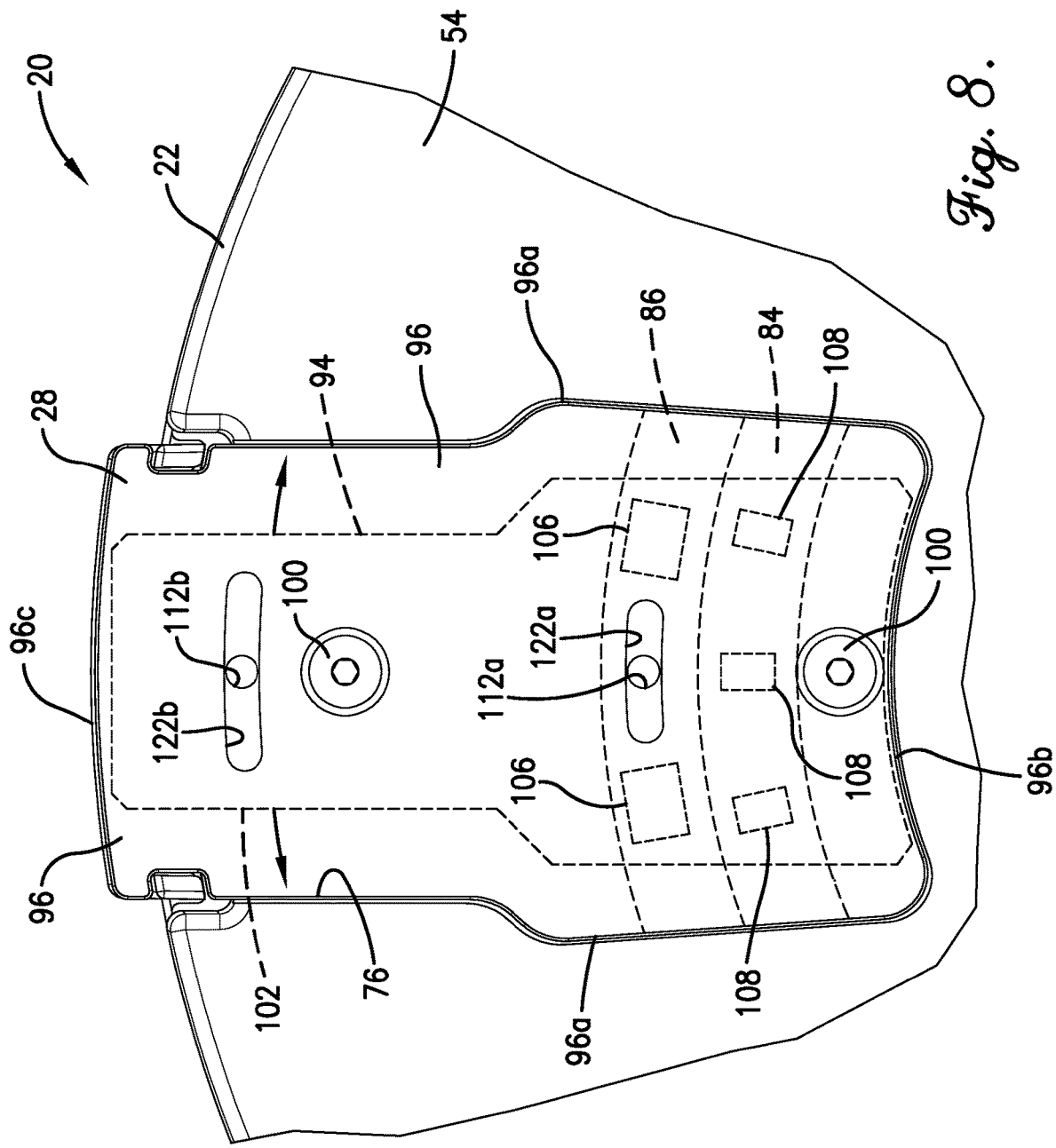
FIG. 8 is a fragmentary front elevation of the electric motor assembly shown in FIGS. 1-7, showing the encoder cover secured onto the endshield with fasteners.

Turning to FIGS. 3 and 5-8, encoder assembly 28 is preferably configured to facilitate commutating motor operation and preferably includes an encoder 94, the encoder cable 70, an encoder cover 96, a cable cover 98, and cover fasteners 100 (see FIGS. 5, 6 and 8). The illustrated encoder 94 preferably includes an encoder board 102, an encoder connector 104, encoder chips 106, and Hall switches 108 (see FIGS. 6 and 8).

Encoder assembly is preferably configured to sense an operational parameter of the motor 24. In particular, encoder chips 106 are preferably located on the encoder board 102 for overlapping radial alignment with magnet sections (not shown) of the encoder track 86. In the depicted embodiment, each encoder chip 106 comprises a sensor assembly mounted on the encoder board 102 and aligned with the encoder opening 74. Preferably, encoder chips 106 each include a magnetic sensing element and are configured to sense the poles of the encoder track 86 to provide A/B incremental encoder output. In alternative embodiments, the encoder board may include an alternative encoder element, such as an LED optical sensor or another optical encoder/ sensor, for sensing the rotational position of the encoder track.

Hall switches 108 are also supported on the encoder board 102 and are configured for overlapping radially alignment with magnet sections 92 of the commutation track 84. Each of the illustrated hall switches 108 comprises a sensor assembly mounted on the encoder board 102 and aligned with the encoder opening 74. Hall switches 108 each preferably include a magnetic sensing element. The hall switches 108 are spaced apart and are configured to sense the poles of the magnetic commutation track 84 to provide U/V/W commutation output.

In alternative embodiments, hall switches or another part of the encoder board may comprise an alternative sensing element, such as an LED optical sensor or another optical encoder/sensor, for sensing the rotational position, direction, velocity, acceleration, and/or other parameters of a corresponding sensed element (such as the commutation track).

Encoder board 102 preferably has a unitary construction and presents opposite side margins 102*a* extending radially between a radially inner end margin 102*b* and a radially outer end margin 102*c* (see FIG. 6). The side margins 102*a* cooperatively define a width profile of the encoder board 102 to present an encoder width dimension W. The width profile is preferably sized and shaped so that the encoder channel 72 shiftably receives the encoder board 102 and permits a limited range of angular swinging movement of the encoder 94 relative to the endshield 54 about the rotor axis A1. Consequently, the encoder board 102 is adjustably positioned within the recessed encoder channel 72. Side margins 102*a* are complementally shaped relative to respective side portions 76*a* of the shoulder 76 of the encoder channel 72 (see FIG. 6).

The depicted inner end margin 102*b* presents a concave shape and is complementally shaped relative to a convex inner end portion 76*b* of the shoulder 76 of the encoder channel 72. The end margin 102*b* and end portion 76*b* are configured and positioned to permit swinging of the encoder 94 relative to the endshield 54 about the rotor axis A1. Although general complemental shaping and sizing of the board 102 and channel 72 is preferred, it is only necessary for the encoder 94 to be shiftable so as to provide the desired alignment.

The illustrated encoder board 102 preferably presents radially inner and outer board adjustment slots 110*a*,110*b* (see FIG. 6) that extend along a circumferential direction. The radially inner board adjustment slot 110*a* is aligned with inner fastener opening 78*a*, while the radially outer board adjustment slot 110*b* is aligned with outer fastener opening 78*b*.

The board adjustment slots 110*a*,110*b* and fastener openings 78*a*,78*b* are configured to receive cover fasteners 100 (see FIG. 8). Cover fasteners 100 each preferably comprise a threaded screw fastener, although the use of other fasteners are within the ambit of at least certain aspects of the present invention. As will be described, cover fasteners 100 are configured to secure the encoder cover 96 to the housing 22. Board adjustment slots 110*a*,110*b* comprise slotted openings to shiftably receive the fasteners 100, such that the encoder board 102 is adjustably positionable relative to the fasteners 100 (until the fasteners 100, or possibly even just one (1) of the fasteners, is tightened).

The cover fasteners 100 extend through the encoder cover 96 and the adjustment slots 110*a*,110*b*, and are threaded into respective fastener openings 78*a*,78*b*. Cover fasteners 100 may be loosely attached to the encoder cover 96 and endshield 54 so that the encoder 94 may be angularly swung within the encoder channel 72. Alternatively, cover fasteners may be selectively fastened to firmly secure the encoder cover 96 against the encoder 94 so that the encoder 94 is frictionally held between the encoder cover 96 and endshield 54 to restrict relative movement of the encoder 94.

Figure 9:
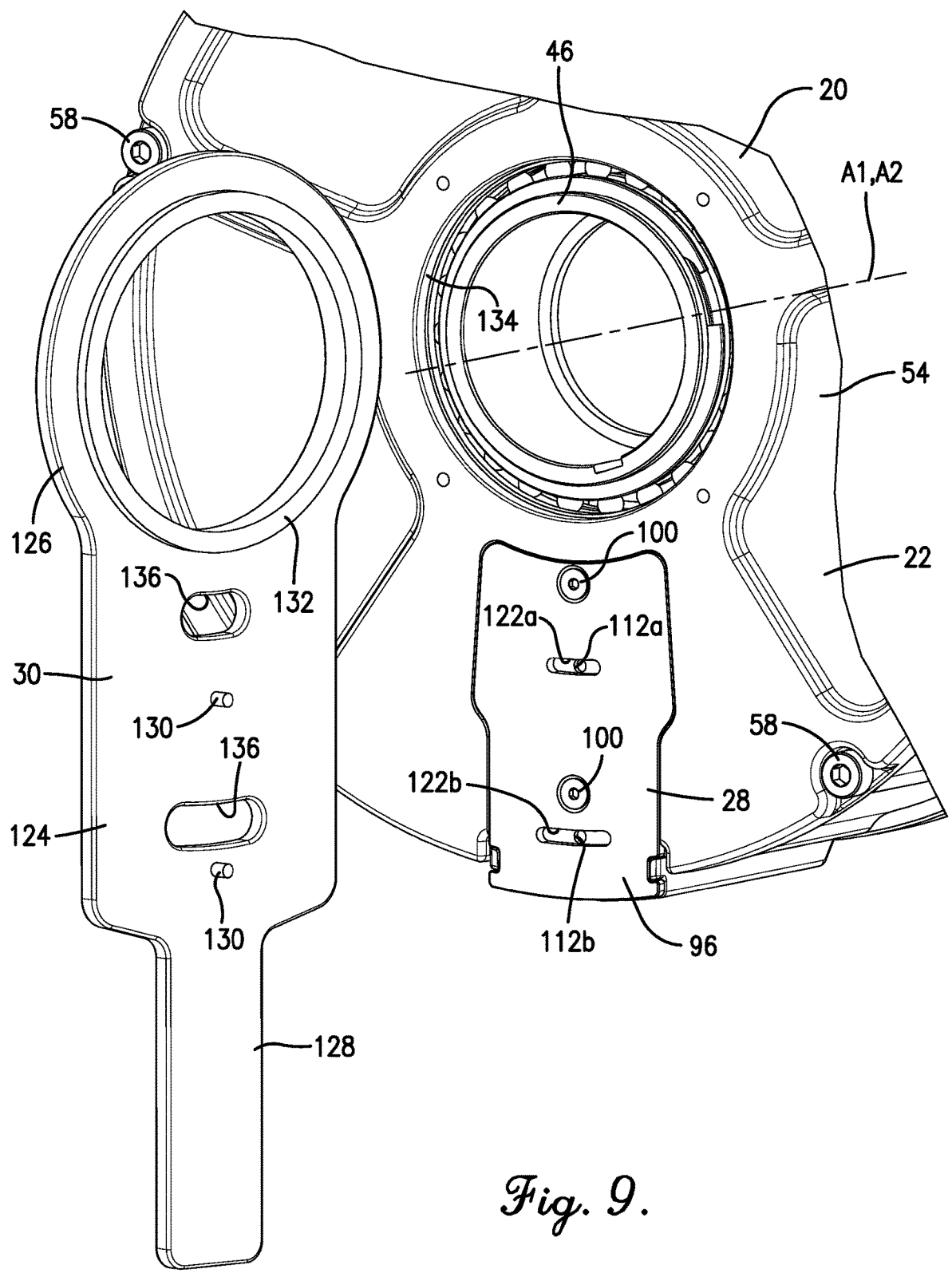
FIG. 9 is a fragmentary perspective of the electric motor assembly shown in FIG. 1, showing an encoder alignment tool for engagement with the encoder, with the alignment tool including a tool body, an alignment ring, a handle, and alignment pins.

Encoder board 102 also preferably presents radially inner and outer tool holes 112*a* and 112*b* (see FIG. 6) configured for removable engagement with the alignment tool 30 (see FIG. 9). As will be explained, the tool holes 112*a*,112*b* comprise holes that removably receive the tool 30 and permit the tool 30 to engage the encoder 94 for swingably adjusting the encoder location relative to the motor housing 22 and the rotor 32.

Encoder connector 104 comprises a multi-contact connector for attachment to a cable connector 114 of the encoder cable 70 (see FIGS. 5 and 6). The encoder cable 70 also preferably includes a ribbon cable 116, with the cable connector 114 being operably attached to the ribbon cable 116 and removably connectable to the encoder connector 104.

Cable cover 98 is configured to be removably attached relative to the motor housing 22 to cover the cable 70 and the cable channel 68. When assembled with the motor housing 22, the cable cover 98 cooperates with the shell 52 to enclose the cable 70 and form a radially outer portion of an encoder chamber 118 (see FIGS. 5 and 6).

The encoder cover 96 preferably has a unitary construction and presents opposite cover side margins 96*a* extending radially between a radially inner end margin 96*b* and a radially outer end margin 96*c* (see FIGS. 7 and 8). The margins 96*a*,96*b*,96*c* of the encoder cover 96 are preferably complementally shaped relative to the shoulder 76 of the encoder channel 72 and the cable cover 98. Thus, when the encoder cover 96 is received in the recessed encoder channel 72, encoder cover 96 snugly engages the endshield 54 and the cable cover 98 along the margins 96*a*,96*b*,96*c*. As will be explained, encoder cover 96 may be loosely or snugly secured within the encoder channel 72.

The encoder cover 96 presents radially inner and outer cover fastener holes 120*a*,120*b* (see FIG. 7). The cover fastener holes 120*a*,120*b* are configured to be aligned with respective board adjustment slots 110*a*,110*b* and fastener openings 78*a*,78*b*. The cover fastener holes 120*a*,120*b* thereby receive corresponding fasteners 100 that then extend through the slots 110*a*,110*b* and into the openings 78*a*,78*b*. Preferably, cover fastener holes 120*a*,120*b* of the depicted encoder cover 96 are complementally shaped with cover fasteners 100 so that the fasteners 100 are snugly received therethrough.

Encoder cover 96 also presents inner and outer cover slots 122*a*,122*b* configured to receive adjustment pins 130 of the alignment tool 30 (see FIGS. 7 and 9). The pin-receiving cover slots 122*a*,122*b* are preferably aligned with respective tool holes 112*a*,112*b* of the encoder board 102. The cover slots 122*a*,122*b* receive the tool 30 when it is connected to the encoder board 102.

As noted above, the cover fasteners 100 are extended through the encoder cover 96 and the adjustment slots 110*a*,110*b*, and are threaded into respective fastener openings 78*a*,78*b*. (Again, alternative fastener designs, such as a nut and bolt arrangement, rivet, and/or other fasteners may be incorporated into certain aspects of the present invention). When the encoder cover 96 is initially attached to the endshield 54, cover fasteners 100 are preferably not tightened down (that is, the fasteners are loosely attached to the encoder cover 96 and endshield 54) so that the encoder 94 may be freely swung within the encoder channel 72. That is, the loosely secured cover 96 and cover fasteners 100 permit the encoder 94 to be adjustably positioned relative to the cover 96, endshield 54, and cover fasteners 100.

Cover fasteners 100 may be used to firmly secure the encoder cover 96 against the encoder 94 so that the encoder 94 is frictionally held between the encoder cover 96 and endshield 54 to restrict relative movement of the encoder 94. For instance, when the encoder 94 is located at a desired operating position, the fasteners 100 may be tightened to firmly hold the cover 96 against the encoder 94 in the operating position.

Encoder cover 96 is preferably secured relative to the endshield 54 to at least partially overlie the encoder board 102. More preferably, encoder cover 96 is configured to be removably attached relative to the motor housing 22 to cover the encoder 94 and the encoder channel 72. When assembled with the motor housing 22, the illustrated encoder cover 96 cooperates with the endshield 54 to enclose the encoder 94 and form part of the encoder chamber 118.

Turning to FIGS. 5-12, the encoder assembly 28 is preferably installed to complete assembly of the motor assembly 20. In preferred embodiments, alignment and installation of the encoder 94 as part of the electric motor 24 may be accomplished with an encoder assembly kit that includes the encoder board 102, the encoder cover 96, and the alignment tool 30.

Preferably, the encoder installation and alignment process may be initiated once the motor housing 22 and motor 24 have been assembled. With traditional motor design, it is difficult to access the encoder to adjust encoder position (assuming the design even accommodates for adjustment). Moreover, attempts to precisely locate the encoder during overall motor assembly may be thwarted by inadvertent shifting caused during the remainder of motor assembly. The invention permits the motor components and motor housing to be fully assembled, with the process of encoder alignment being performed afterwards. The encoder installation and alignment process reduces and/or eliminates the risk of inadvertent encoder misalignment and simplifies the encoder alignment process.

Initially, the cable 70 is preferably routed from a location adjacent the endshield 56 and through the cable channel 68, so that the cable connector 114 is located adjacent the encoder opening 74 of the endshield 54 (see FIG. 2). With the cable 70 located in the cable channel 68, cable cover 98 may be placed in engagement with the cable channel 68 and the endshield 54 to enclose the cable channel 68 (see FIG. 5).

The encoder 94 may be operably connected to the cable 70 via the encoder connector 104 and cable connector 114. Encoder board 102 may then be located relative to the housing 22 so that the encoder board 102 is received by the encoder channel 72 (see FIG. 6). It will be appreciated that the inner end margin 102b of the encoder 94 is preferably located adjacent the shoulder end portion 76b for relative sliding movement of the encoder 94. Although the encoder 94 is preferably not fastened directly to the motor housing 22 or the motor 24 during this step, the adjustment slots 110a,110b of the encoder 94 may be approximately aligned with respective fastener openings 78a,78b.

With encoder 94 inserted into the encoder channel 72, encoder cover 96 may be positioned over the encoder channel 72 and the encoder 94 to cover the encoder 94 and enclose the encoder channel 72 (see FIG. 7). It will be understood that the inner end margin 96b of the encoder cover 96 is preferably located in engagement with the shoulder end portion 76b. Side margins 96a also engage respective side portions 76a of the shoulder 76. Preferably, the cover fastener holes 120a,120b are aligned with respective board adjustment slots 110a,110b and fastener openings 78a,78b to receive corresponding cover fasteners 100.

Having located the encoder cover 96 onto the endshield 54, cover fasteners 100 may be inserted through cover fastener holes 120a,120b and board adjustment slots 110a, 110b and partly threaded into fastener openings 78a,b (see FIGS. 7 and 8). The fasteners 100 may be loosely secured to permit angular swinging movement of the encoder 94 within the encoder channel 72.

Encoder alignment tool 30 (see FIGS. 9 and 10) preferably facilitates optimal alignment of the encoder 94 to the motor 24. The illustrated tool 30 is configured to engage the encoder board 102 to facilitate swinging movement of the encoder 94 within the encoder channel 72. Alignment tool 30 preferably includes a tool body 124, an alignment ring 126, a tool handle 128, and adjustment pins 130 (see FIGS. 9 and 10). The alignment ring 126 includes a circumferentially extending rim 132 configured to engage a circular inner margin 134 (see FIG. 9) of the endshield 54. Tool body 124 presents fastener-receiving slots 136 adjacent to the adjustment pins 130.

Tool handle 128 extends from the tool body 124 and permits a user to grasp the tool 30. The alignment ring 126 is configured to slidably engage the housing 22 so as to restrict the alignment tool 30 to swinging movement of the tool handle 128 relative to the housing 22. In particular, encoder alignment tool 30 is operable to be removably positioned on the endshield 54 for adjusting the angular position of the encoder 94 relative to the motor housing 22 and the motor 24. Preferably, the alignment tool 30 is not operably supported by the rotor shaft 46. However, in alternative embodiments, the alignment tool may be configured for supporting engagement with the rotor shaft.

With the encoder 94 and encoder cover 96 loosely secured relative to the endshield 54 by cover fasteners 100, the alignment tool 30 may be positioned on the motor assembly 20 and removably coupled with the encoder board 102 for aligning the encoder board 102 with the stator 34. Tool 30 is located so that the rim 132 is rotatably positioned in engagement with the circular inner margin 134. The adjustment pins 130 are also located to extend through the pin-receiving cover slots 122a,122b and the tool holes 112a,112b (see FIGS. 9 and 10). It will be appreciated that the slots 136 are preferably aligned with cover fasteners 100 and permit loosening and tightening of the cover fasteners 100 while the alignment tool 30 is located on the motor assembly 20. Slots 136 are also configured to receive the fasteners 100 therethrough, such that the alignment tool 30 is shiftable relative to the fasteners 100. The fasteners 100 may be initially coupled with the endshield 54 before or after the tool 30 is coupled to the board 102. Further, the fasteners 100 may remain at least partly within the slots 136 of the tool 30 during adjustable positioning of the encoder board 102.

Thus, tool holes 112a,112b in the encoder board 102 and adjustment pins 130 of the alignment tool 30 cooperatively present a complemental pin and hole arrangement. Adjustment pins 130 are removably receivable within the holes provided by tool holes 112a,112b to removably couple the encoder board 102 and alignment tool 30. Thus, coupling of the alignment tool 30 and encoder board 102 preferably includes the step of inserting pins 130 associated with the alignment tool 30 into tool holes 112a,112b associated with the encoder board 102. The preferred coupling step also includes the step of passing the pins 130 through pin-receiving cover slots 122a,122b defined in the encoder cover 96.

Although the illustrated pin and hole arrangement is preferred, various embodiments of the alignment tool and/or the encoder board may include alternative features that facilitate removable coupling between the alignment tool and the encoder board. For example, an alternative encoder assembly kit may have one or more pins associated with the encoder board and one or more complemental pin-receiving holes associated with the encoder board. In such an alternative embodiment, it will be understood that coupling between the alignment tool and encoder board may include the step of inserting a pin associated with the encoder board into a hole associated with the alignment tool. In such an alternative arrangement, the pin(s) projecting from the encoder board would extend through the slot(s) of the encoder cover.

Adjustment pins 130 extend through the pin-receiving cover slots 122a,122b when the tool 30 is engaged with the encoder board 102, such that the pins 130 are shiftable through the slots 122a,122b as the tool 30 and encoder board 102 are moved together. Pins 130 project inwardly from the tool body 124, through the cover slots 122a,122b, and into the tool holes 112a,112b when the tool 30 is removably coupled with the encoder board 102.

Tool 30 is preferably located for rotation about the rotor axis A1, such that the tool 30 rotates about the rotor axis A1 and generally swings the encoder board 102 arcuately about the rotor axis. By swinging the encoder board 102 about the rotor axis A1, the board 102, encoder chips 106, and Hall switches 108 move along a path that is generally concentric relative to the code wheel (26), provided that adjustment slots 110a,110b and cover slots 122a, 122b are appropriately (arcuately) shaped to accommodate such movement. The user may selectively shift the encoder board 102 relative to the housing 22 using the alignment tool 30 until the encoder board 102 is aligned. In the depicted embodiment, the shifting step preferably includes the step of shifting the pins 130 along the pin-receiving cover slots 122a, 122b.

It is noted that each pin 130 is preferably complementally shaped and sized with the corresponding hole 112a or 112b, which ensures generally one-to-one or matching shifting movement between the tool 30 and encoder board 102 when coupled. Most preferably, each pin 130 is cylindrical in shape, and the corresponding hole 112a or 112b has the same shape but is slightly oversized to snugly receive the pin therein. However, each pin and hole pair could have an alternative shape (such as polygonal or oblong) or the pin and hole might have different shapes (such as one being polygonal and the other being cylindrical) but still have complemental sizes so that corresponding movement is maintained between the tool and board. Furthermore, the cover slots 122a,122b are preferably shaped and sized so that the pins 130 slidably engage the slot walls during shifting of the tool 30 and encoder board 102. Such interengagement serves to limit shifting of the tool 30 and board 102 along the path defined by the slot. (As noted, shifting of the tool 30, and thereby the board 102, is also preferably limited by sliding engagement of the alignment ring 126 with the endshield 54.) The preferred embodiment includes multiple pin-hole-slot combinations, but certain aspects of the present invention contemplate a single pin-hole-slot combination. It is also noted that the relationship is similar with respect to the fasteners 100 and the corresponding openings in the tool 30, encoder cover 96, and encoder board 102 (in terms of a slotted opening defining a path along which the board and tool are capable of shifting relative to the fasteners). Yet further, certain aspects of the present invention contemplate only one structural feature limiting movement of the tool 30 and encoder board 102 along the desired arcuate path. For example, the tool and board might alternatively receive oversized openings for loosely receiving the fasteners (such that neither the tool or board are capable of engaging the fasteners when the tool and board are moved), while the pin-hole-slot combination(s) still limit such movement as described.

Preferably, the motor assembly 20 is operably connected to a testing device (such as an oscilloscope) to display a stator output waveform S and an encoder output waveform E when back-driving the motor 24. When the encoder 94 is in an aligned condition, the stator waveform S preferably crosses the zero voltage line at locations where the encoder waveform E transitions between a value of zero and a value of one, such that the waveforms are in phase with one another (see FIG. 12). When the encoder 94 is in a misaligned condition, the stator waveform S crosses the zero voltage line at locations that are offset from the transition locations of the encoder waveform E, such that the waveforms are out of phase with one another (see FIG. 11).

To complete the process of aligning the encoder 94 to the code wheel 26, the stator output and encoder output waveforms are displayed by the testing device to determine if the encoder 94 is misaligned relative to the stator 34. If the encoder 94 is misaligned (see FIG. 11), an operator may rotate the alignment tool 30 out of the misaligned condition in one of opposite rotation directions until the waveforms are relatively shifted so that the encoder waveform E is substantially aligned (see FIG. 12) with the stator waveform S (that is, where the stator waveform S crosses the zero voltage line at locations that are substantially aligned with the transition locations of the encoder waveform). Such rotation of the tool 30 is accomplished by swinging of the tool handle 128, with such swinging movement being "keyed" by sliding contact between the alignment ring 126 and the endshield 54.

Having located the encoder 94 in the aligned condition, the cover fasteners 100 may be fastened to secure the encoder cover 96 in frictional engagement with the encoder board 102 and relative to the housing 22. Preferably, the encoder cover 96 is fastened in an overlying relationship with the encoder board 102. Cover fasteners 100 are secured so that the encoder cover 96 and endshield 54 cooperatively frictionally engage the encoder board 102 and restrict movement of the encoder board 102 relative to the endshield 54 and the rest of the housing 22.

The fastening step preferably includes the steps of inserting the cover fasteners 100 through fastener-receiving slots 136 of the tool 30 (although some aspects contemplate the fasteners 100 already being loosely coupled to the endshield 54 before the tool 30 is coupled to the encoder 94), receiving the cover fasteners 100 through fastener-receiving holes 120a,120b in the encoder cover 96, passing the fasteners 100 through adjustment slots 110a,110b in the encoder board 102, and securely engaging the fasteners 100 to the housing 22 so that the encoder board 102 is clamped into place by the encoder cover 96.

Shifting of the encoder board 102 using the alignment tool 30 is preferably performed between the steps of passing the fasteners 100 through adjustment slots 110a,110b and securely engaging the fasteners 100 to the housing 22. Embodiments of the shifting step may also include the step of swinging the alignment tool 30, and thereby the encoder board 102, relative to the housing 22.

It will also be appreciated that the cover fasteners 100 may be selectively loosened to permit further adjustment of the encoder 94. For instance, if the encoder 94 is misaligned relative to the stator 34 while secured by the fasteners 100 (for example, during motor transport), the fasteners 100 may be loosened to permit shifting of the encoder 94 into an aligned condition by the tool 30. Once the encoder 94 is aligned, the fasteners 100 may again be re-tightened to secure the encoder 94.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The present application relies on the Doctrine of Equivalents to determine and assess the reasonably fair scope of the present invention as pertains to any apparatus not materially departing from but outside the literal scope of the invention as set forth in the following claim.

We claim:

1. An electric motor comprising:
 a stator;
 a rotor rotatable relative to the stator;
 a housing defining a motor chamber in which the stator and rotor are at least partly housed,
 said housing including an endshield that defines in part the motor chamber;
 an encoder assembly configured to sense an operational parameter of the motor,
 said encoder assembly including an encoder and an encoder cover,
 said endshield including an axially recessed encoder channel and an aligned encoder opening aligned with the encoder channel, the encoder opening extending between the recessed encoder channel and the motor chamber,
 said encoder being adjustably positioned within the recessed encoder channel,
 said encoder cover being secured relative to the endshield to at least partially overlie the encoder,
 said encoder including an encoder board and a sensor assembly mounted on the encoder board,
 said sensor assembly being aligned with the encoder opening,
 said sensor assembly including a magnetic sensing element, and
 a magnetic commutation track fixed relative to the rotor for rotational movement therewith,
 said magnetic commutation track defining circumferentially arranged poles corresponding to a polarity of the rotor,
 said magnetic sensing element configured to sense the poles of the magnetic commutation track,
 said encoder including a tool-receiving hole,
 said encoder cover including a tool-receiving slot, with the tool-receiving hole remaining aligned with the tool-receiving slot as the encoder is adjustably positioned.

2. The electric motor as claimed in claim 1,
 said encoder assembly including a fastener that secures the encoder cover to the endshield,
 said encoder including a slotted opening receiving the fastener therethrough, such that the encoder is adjustably positionable relative to the fastener.

3. An electric motor comprising:
 a stator;
 a rotor rotatable relative to the stator;
 a housing defining a motor chamber in which the stator and rotor are at least partly housed,
 said housing including an endshield that defines in part the motor chamber; and
 an encoder assembly configured to sense an operational parameter of the motor,
 said encoder assembly including an encoder and an encoder cover,
 said endshield including an axially recessed encoder channel and an aligned encoder opening aligned with the encoder channel, the encoder opening extending between the recessed encoder channel and the motor chamber,
 said encoder being adjustably positioned within the recessed encoder channel,
 said encoder cover being secured relative to the endshield to at least partially overlie the encoder,
 said encoder assembly including a fastener that secures the encoder cover to the endshield,
 said encoder including a slotted opening receiving the fastener therethrough, such that the encoder is adjustably positionable relative to the fastener,
 said encoder cover being received in the recessed encoder channel.

4. The electric motor as claimed in claim 3,
 said encoder including a tool-receiving hole,
 said encoder cover including a tool-receiving slot, with the tool-receiving hole remaining aligned with the tool-receiving slot as the encoder is adjustably positioned.

5. The electric motor as claimed in claim 3,
 said encoder including a sensor assembly aligned with the encoder opening.

6. The electric motor as claimed in claim 5, said sensor assembly including a magnetic sensing element.

7. The electric motor as claimed in claim 6, further comprising:
 a magnetic commutation track fixed relative to the rotor for rotational movement therewith,
 said magnetic commutation track defining circumferentially arranged poles corresponding to a polarity of the rotor,
 said magnetic sensing element configured to sense the poles of the magnetic commutation track.

8. The electric motor as claimed in claim 5, further comprising:
 a code wheel fixed relative to the rotor for rotational movement therewith,
 said code wheel defining circumferentially arranged poles corresponding to a polarity of the rotor,
 said sensor assembly configured to sense the poles of the code wheel.

* * * * *